United States Patent Office 2,845,434
Patented July 29, 1958

2,845,434

DIALKYLAMINOETHYL ESTER SALTS OF CYCLIC GUANIDINO ACIDS AND THEIR PREPARATION

Gordon A. Grant, Mount Royal, Quebec, and Stanley O. Winthrop, Montreal, Quebec, Canada, assignors to American Home Products Corporation, New York, N. Y., a corporation of Delaware No Drawing. Application November 27, 1956
Serial No. 624,497

16 Claims. (Cl. 260—309.6)

This invention relates to new chemical compounds which are of potential value in medicine, and to the method by which they may be prepared.

More particularly, our invention relates to a series of new compounds which may be generally characterized as dialkylaminoethyl ester salts of cyclic guanidino acids which may be represented by the following generic formula:

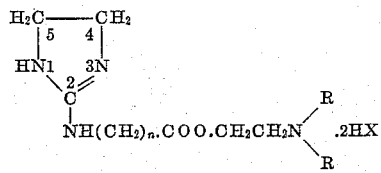

where $n$ is an integer from 1 to 5, R represents lower alkyl, and HX represents hydrogen halide.

As the new chemical compounds in the form of the basic ester do not possess the stability characteristic of the acid salts thereof, the free basic esters, in fact, being generally unstable, our invention includes novel chemical compounds of the generic formula specified where these compounds are in salt form. In the form of their salts, these compounds possess properties characteristic of the basic esters insofar as their usefulness in medicine is concerned. They are, moreover, considerably more stable than the basic esters themselves, and provide a form in which the basic esters may be more readily recovered in manufacturing operations.

In preparing our novel chemical compounds we bring together, preferably at an elevated temperature and while suspended in an inert solvent, a 2-(ω-carboxyalkylamino)-Δ²-imidazoline and a dialkylaminoethanol. Generally these reactants are brought together in substantially equimolar proportions. The reaction is complete within a number of hours when the two reactants are heated at an elevated temperature over 100° C. while dispersed in the inert solvent in the presence of a hydrogen halide.

In order to recover the novel compounds in salt form, a hydrogen halide may be slowly bubbled through the reaction mixture, or otherwise added thereto if the hydrogen halide utilized is not gaseous, or cannot be readily vaporized. Simultaneously it is usually desirable to remove part of the inert solvent by distillation.

For purposes of our invention picric acid, although a phenol having strong acidic properties, behaves as an acid and its salts are useful for characterization of our new compounds.

The new basic ester hydrohalides, in particular the hydrochlorides, are active as hypotensive agents, and they may be used in medicine for lowering the blood pressure of human beings and animals.

The starting material, the 2-(ω-carboxyalkylamino)-Δ²-imidazoline, may be prepared in accordance with the process disclosed in the patent application of Arthur F. McKay, Serial No. 487,713. In accordance with the procedure disclosed in this patent application, an amino acid is reacted with a 2-methylmercapto-Δ²-1,3-diazacycloalkene salt, the reaction being carried out in an aqueous alkaline solution. The alkaline agent is preferably an aqueous solution of an inorganic base, such as ammonium hydroxide, sodium hydroxide or potassium hydroxide.

The starting material, 2-(ω-carboxymethylamino)-Δ²-imidazoline, as employed herein may be prepared in accordance with the procedure of McKay by reacting 2-methylmercapto-2-imidazolinium iodide and glycine in an aqueous solution of a base, such as an aqueous 28% ammonium hydroxide solution. When the evolution of methylmercaptan has ceased, the final solution, when kept at a low temperature such as 5° C. overnight, will deposit crystals of the desired diazacyclopentene compound.

The starting material, 2-(ω-carboxypropylamino)-Δ²-imidazoline may be prepared by the method of McKay by reacting 2-methylmercapto-Δ²-imidazolinium iodide and α-amino-n-butyric acid in a solution of aqueous sodium hydroxide at an elevated temperature. When methylmercaptan evolution has ceased, the new compound may be readily recovered from the purified reaction mixture as by evaporation to dryness. It may be recrystallized from a mixture of methanol and acetone to secure the relatively pure starting material.

The starting material, 2-(ω-carboxypentylamino)-Δ²-imidazoline may be prepared in accordance with the method of McKay by reacting 2-methylmercapto-Δ²-imidazolinium iodide with ε-amino-n-caproic acid in an aqueous solution of sodium hydroxide at an elevated temperature. After evolution of methylmercaptan has ceased, the starting material may be recovered from the purified reaction mixture as by evaporation to dryness and recrystallized from a methanol solution.

Our invention may be illustrated by the following examples.

Example 1

9.9 grams (0.05 mole) of 2-(ω-carboxypentylamino)-Δ²-imidazoline and 4.5 grams (0.05 mole) of dimethylaminoethanol were suspended in 150 milliliters of toluene, and the reaction mixture was then heated at about 140° C. for ten hours. Hydrogen chloride was bubbled through and the toluene distilled over slowly. Additional toluene was added when necessary.

The reaction mixture was then allowed to cool and the toluene could be decanted away from the product which was an insoluble, viscous oil. The product, the dimethylaminoethyl ester dihydrochloride of 2-(ω-carboxypentylamino)-Δ²-imidazoline, was dried under high vacuum. Calculated for $C_{13}H_{28}N_4O_2Cl_2$: Cl, 20.62. Found: Cl, 19.24.

An alcoholic solution containing approximately one equivalent of picric acid was added to an alcoholic solution of the dihydrochloride, and there was thereupon secured 17 g. of monohydrochloride-monopicrate salt of the dimethylaminoethyl ester of 2-(ω-carboxypentylamino)-Δ²-imidazoline.

A representative sample of the product melted at 183–185° C. When recrystallized from ethanol, a representative sample melted at 186–187.5° C. The compound has the empiric formula $C_{19}H_{30}N_7O_9Cl$.

Example 2

8.5 grams (0.05 mole) of 2-(ω-carboxypropylamino)-Δ²-imidazoline and 4.5 grams (0.05 mole) of dimethylaminoethanol were brought together in toluene, and the reaction mixture heated, following the same procedure as described in Example 1. The procedure as therein described was continued until the oily product was recovered. The product was the dimethylaminoethyl ester dihydrochloride of 2-(ω-carboxypropylamino)-Δ²-imidazoline. An alcoholic solution containing approximately 1 equivalent of picric acid was then added, and there were thus obtained 12 grams of the monohydrochloride-monopicrate salt of the dimethylaminoethyl ester of 2-(ω-carboxypropylamino)-Δ²-imidazoline of the empiric formula $C_{17}H_{26}N_7O_9Cl$. As recovered the salt melted at 183–185° C. When recrystallized from acetonitrile, there was obtained 8.5 grams of the substantially pure product, a representative sample of which melted at 188–189° C.

Calc'd.: C, 40.25; H, 5.16; N, 19.35; Cl, 6.98. Found: C, 40.44; H, 5.15; N, 19.25; 19.61; Cl, 6.70; 6.73.

*Example 3*

7.2 grams (0.05 mole) of 2-carboxymethylamino-Δ²-imidazoline and 4.5 grams (0.05 mole) of dimethylaminoethanol were reacted in toluene following the procedure described in Example 1. There was thus produced the dimethylaminoethyl ester dihydrochloride of 2-carboxymethylamino-Δ²-imidazoline. An alcoholic solution containing an excess of picric acid was added. There was recovered 16.2 grams of the dipicrate salt of the dimethylaminoethyl ester of 2-carboxymethylamino-Δ²-imidazoline, a typical sample of which melted at 152–156° C. The product had the empiric formula $C_{21}H_{24}N_{10}O_{16}$. Two recrystallizations from acetonitrile gave the substantially pure product, a typical sample of which melted at 161.5–165.5° C.

Calc'd.: C, 37.55; H, 3.57; N, 20.85. Found: C, 37.85; H, 3.46; N, 20.50; 20.57.

*Example 4*

9.9 grams (0.05 mole) of 2-(ω-carboxypentylamino)-Δ²-imidazoline and 7.3 grams (0.05 mole) of diisopropylaminoethanol were brought together in toluene at an elevated temperature in excess of 100° C., following the procedure described in Example 1. There was thus produced the diisopropylaminoethyl ester dihydrochloride of 2-(ω-carboxypentylamino)-Δ²-imidazoline. The process was then continued, following the procedure described in that example. An alcoholic solution containing an excess of picric acid was added. There were obtained 34 grams of the dipicrate salt of the diisopropylaminoethyl ester of 2-(ω-carboxypentylamino)-Δ²-imidazoline of empiric formula $C_{29}H_{40}N_{10}O_{16}$. A typical sample melted at 121–127° C. Two recrystallizations from acetonitrile gave the substantially pure product, a typical sample of which melted at 127–130° C.

Calc'd.: C, 44.35; H, 5.14; N, 17.85. Found: C, 44.76; H, 5.08; N, 17.56; 17.78.

*Example 5*

9.9 grams (0.05 mole) of 2-(ω-carboxypentylamino)-Δ²-imidazoline and 5.9 grams (0.05 mole) of diethylaminoethanol were brought together at an elevated temperature in excess of 100° C. in toluene as inert solvent, following the procedure described in Example 1. As in Example 1, and in the other examples given above, hydrogen chloride was bubbled through the reaction mixture and the toluene distilled over slowly. Additional toluene was added as necessary. The reaction mixture was then allowed to cool, the toluene decanted, and an oily residue secured. The product was the diethylaminoethyl ester dihydrochloride of 2-(ω-carboxypentylamino)-Δ²-imidazoline. An alcoholic solution containing an excess of picric acid was added. There was obtained 26 grams of the dipicrate salt of the diethylaminoethyl ester of 2-(ω-carboxypentylamino)-Δ²-imidazoline of empiric formula $C_{27}H_{36}N_{10}O_{16}$. A typical sample of the product melted at 116–121° C. Two recrystallizations from acetonitrile gave the substantially pure product, a typical sample of which melted at 120–123° C.

Calc'd.: C, 42.85; H, 4.79; N, 18.51. Found: C, 43.15; H, 4.51; N, 18.49; 18.66.

We claim:

1. A di-lower alkylaminoethyl ester salt of a cyclic guanidino acid having the formula:

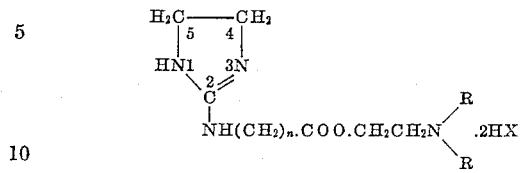

where *n* is an integer from 1 to 5 inclusive, R is lower alkyl, and HX represents a hydrogen halide.

2. A di-lower alkylaminoethyl ester salt of a cyclic guanidino acid having the formula:

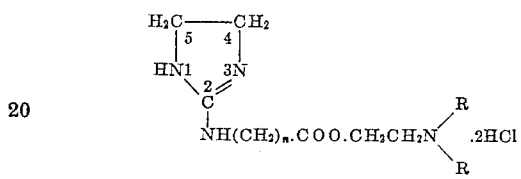

where *n* is an integer from 1 to 5 inclusive and R is lower alkyl.

3. Dimethylaminoethyl ester dihydrochloride of 2-(ω-carboxypentylamino)-Δ²-imidazoline.

4. Dimethylaminoethyl ester dihydrochloride of 2-(ω-carboxypropylamino)-Δ²-imidazoline.

5. Dimethylaminoethyl ester dihydrochloride of 2-carboxymethylamino-Δ²-imidazoline.

6. Diisopropylaminoethyl ester dihydrochloride of 2-(ω-carboxypentylamino)-Δ²-imidazoline.

7. Diethylaminoethyl ester dihydrochloride of 2-(ω-carboxypentylamino)-Δ²-imidazoline.

8. The method of preparing a di-lower alkylaminoethyl ester salt of a cyclic guanidino acid which comprises bringing together in an inert solvent at a temperature in excess of 100° C. a 2-(ω-carboxy lower alkylamino)-Δ²-imidazoline, a di-lower alkylaminoethanol and a hydrogen halide.

9. The method of preparing a di-lower alkylaminoethyl ester salt of a cyclic guanidino acid which comprises bringing together in an inert solvent at a temperature in excess of 100° C. a 2-(ω-carboxy lower alkylamino)-Δ²-imidazoline, a di-lower alkylaminoethanol and hydrogen chloride.

10. The method of preparing a di-lower alkylaminoethyl ester salt of a cyclic guanidino acid which comprises bringing together, in substantially equimolar proportions at a temperature in excess of 100° C. and in an inert solvent, a 2-(ω-carboxy lower alkylamino)-Δ²-imidazoline and a di-lower alkylaminoethanol and bringing a hydrogen halide in contact with the reaction mixture.

11. The method of preparing a di-lower alkylaminoethyl ester salt of a cyclic guanidino acid which comprises bringing together, in substantially equimolar proportions at a temperature in excess of 100° C. and in an inert solvent, a 2-(ω-carboxy lower alkylamino)-Δ²-imidazoline and a di-lower alkylaminoethanol and bubbling hydrogen chloride through the reaction mixture.

12. The method of preparing the dimethylaminoethyl ester dihydrochloride of 2-(ω-carboxypentylamino)-Δ²-imidazoline which comprises bringing together at a temperature in excess of 100° C. in an inert solvent 2-(ω-carboxypentylamino)-Δ²-imidazoline and dimethylaminoethanol, and bringing the reaction mixture into contact with hydrogen chloride.

13. The method of preparing the dimethylaminoethyl ester dihydrochloride of 2-(ω-carboxypentylamino)-Δ²-imidazoline which comprises bringing together at a temperature in excess of 100° C. in an inert solvent 2-(ω-carboxypropylamino)-Δ²-imidazoline and dimethylaminoethanol and bringing the reaction mixture into contact with hydrogen chloride.

14. The method of preparing the dimethylaminoethyl ester dihydrochloride of 2-(ω-carboxypentylamino)-Δ²-imidazoline which comprises bringing together at a temperature in excess of 100° C. in an inert solvent 2-carboxymethylamino-Δ²-imidazoline and dimethylamino-ethanol, and bringing the reaction mixture into contact with hydrogen chloride.

15. The method of preparing the dimethylaminoethyl ester dihydrochloride of 2-(ω-carboxypentylamino)-Δ²-imidazoline which comprises bringing together at a temperature in excess of 100° C. in an inert solvent 2-(ω-carboxypentylamino)-Δ²-imidazoline and diisopropylaminoethanol, and bringing the reaction mixture into contact with hydrogen chloride.

16. The method of preparing the dimethylaminoethyl ester dihydrochloride of 2-(ω-carboxypentylamino)-Δ²-imidazoline which comprises bringing together at a temperature in excess of 100° C. in an inert solvent 2-(ω-carboxypentylamino)-Δ²-imidazoline and diethylaminoethanol, and bringing the reaction mixture into contact with hydrogen chloride.

No references cited.